United States Patent [19]

Wickman et al.

[11] Patent Number: 5,048,907
[45] Date of Patent: Sep. 17, 1991

[54] ELECTRIC FIELD INDUCED QUANTUM WELL WAVEGUIDES

[75] Inventors: Randy W. Wickman; Anthony L. Moretti, both of Naperville, Ill.

[73] Assignee: Amoco Corporation, Chicago, Ill.

[21] Appl. No.: 484,685

[22] Filed: Feb. 23, 1990

[51] Int. Cl.[5] .............................................. G02B 6/10
[52] U.S. Cl. ...................................... 385/2; 385/130
[58] Field of Search ........................ 350/96.12, 96.14

[56] References Cited

U.S. PATENT DOCUMENTS

| | | | |
|---|---|---|---|
| 3,695,745 | 10/1972 | Furukawa | 350/96 WG |
| 4,715,680 | 12/1987 | Kawaguchi et al. | 350/96.34 |
| 4,867,516 | 9/1989 | Baker | 350/96.14 |

OTHER PUBLICATIONS

"Quantum Wells for Photonics", Daniel Chemla, Physics Today, May 1985.
"Solid-State Superlattices", Gottfried H. Dönler, Scientific American, Nov. 1983.
"Electro-Optic Phase Modulation in GaAs/AlGaAs Quantum Well Waveguides", J. E. Zucker, T. L. Hendrickson, C. Burrus, A. C. Gossard, from proceedings of the International Quantum Electronics Conference, Baltimore, Maryland, 1987.
"GaAs/AlGaAs Multiple Quantum Well Field-Induced Optical Waveguide", Huang et al., Appl. Phys. Lett., vol. 57, No. 2, Jul. 9, 1990, pp. 114–116.
"Electro-Optic Phase Modulation in GaAs/AlGaAs Quantum Well Waveguides", J. E. Zucker, T. L. Hendrickson, C. A. Burrus, Appl. Phys. Lett. 52 (12), Mar. 21, 1988.
"Voltage-Induced Optical Waveguide"; D. J. Channin, Appl. Phys. Lett., vol. 19, No. 5, Sep. 1, 1971.

Primary Examiner—William L. Sikes
Assistant Examiner—Robert E. Wise
Attorney, Agent, or Firm—Richard A. Kretchmer; William H. Magidson; Ralph C. Medhurst

[57] ABSTRACT

The invention is directed to laterally confined optical waveguide devices in semiconductors using quantum-well structures. An optical waveguide having a core comprising at least one quantum-well structure is interposed between first and second cladding regions such that an optical beam inserted into the core region spreads laterally with respect to a primary direction of the beam. Contacts are fabricated on the surface of the top cladding region and serve as means for applying an electric field to the core of the waveguide. The electric field induces a change in the refractive index of the portion of the quantum-well structure within the field. The change in the refractive index functions to laterally confine the propagation of the optical beam to the region of the core within the electric field, while maintaining a low loss transmission. Controlling the lateral propagation of an optical beam by way of an applied electric field allows a family of low-loss optical devices such as modulators and switches to be realized. Such devices can be fabricated without regard to their orientation in the crystalline structure of the semiconductor material.

25 Claims, 4 Drawing Sheets

ELECTRIC FIELD INDUCED QUANTUM WELL WAVEGUIDES

TECHNICAL FIELD

The invention generally deals with photonic devices and more particularly is directed to photonic devices incorporating quantum well structures.

BACKGROUND

Considerable efforts have been made in recent years to develop new devices utilizing photonic technology, since photonics offers features that cannot be duplicated by conventional electronics. For example, photonics is well established in long distance telecommunications as exemplified by the extensive use of fiber-optic cable. More recently, efforts have been made to derive the advantages of photonics in the area of information processing.

Presently, the field of information processing is dominated by electronics. While electronics combines speed, control, and precision with low cost, it has shortcomings in the bandwidth (amount of information) that can be carried on an electronic channel, and it suffers from susceptibility to electromagnetic interference. Although bandwidth can be effectively increased by implementing many side-by-side electronic channels, this approach requires that special attention be paid to isolating each channel from the others, resulting in increased size and higher cost. The result is that electronics suffers from a mismatch between the speed of handling information within a processor system and the rate of sending information between processors or from a processor to an outside user. Thus, there is a communications bottleneck inherent in electronics. Photonics offers the possibility of overcoming this bottleneck and greatly expanding the performance capability of information-processing systems.

In attempts to overcome the inherent bottleneck of electronic systems, a number of technologies have been demonstrated for modulating an optical signal using electronic signals. These include mechanical devices that physically move fibers or that physically move lenses or mirrors directing an optical beam. These devices are difficult to fabricate and have been essentially limited to special purpose applications where the high costs of such devices can be justified. An alternative approach is to form waveguides from materials whose optical properties can be controlled in order to modulate light propagating through the material. In many materials, their optical properties (specifically the refractive index) can be altered under the application of an electric field using an effect that is commonly referred to as the "linear" electrooptic effect. By identifying the electrooptic effect in certain materials as "linear", it is distinguished from other electrooptic effects in other materials which stem from different underlying physical phenomenon, as discussed hereinafter. Ferroelectrics are an example of a type of material having a strong linear electrooptic effect and good transparency in both the visible and near infrared spectral regions. A large dielectric polarizability characterizes ferroelectrics and leads to their large linear electrooptic effect. Described mathematically, the predominant term of the electrooptic effect in materials such as ferroelectrics is linear with respect to the strength of an applied electric field—hence the name "linear" electrooptic effect. This large linear electrooptic effect in ferroelectrics has been used in various ways to construct waveguide devices which are capable of modulating an electrical signal onto light. Some examples include phase modulators, directional-coupler switches and Mach-Zehnder interferometers.

A different and unusual use of this linear electrooptic effect is in a voltage-induced optical waveguide modulator. Such a device was first proposed and demonstrated by D.J. Channin ("Voltage-Induced Optical Waveguide," Applied Physics Letters, Vol. 19, No. 5, pp. 128-130, 1971), but because of fabrication difficulties, no practical devices have been constructed using this technique. In this device, voltage is applied to a pair of coplanar electrodes separated by a small gap on an electrooptic substrate made from a ferroelectric such as lithium niobate ($LiNbO_3$). The resulting electric field induces a change in the refractive index of the substrate that forms an optical waveguide which allows modes of propagation in the inter-electrode gap region.

Semiconductor compounds formed from combinations of the Group III and V elements and from combinations of the Group II and VI elements also exhibit a change in their optical properties in response to the presence of an electric field. For example, gallium arsenide (GaAs) and aluminum gallium arsenide ($Al_xGa_{1-x}As$) and the quatinary compound aluminum gallium indium arsenide (($Al_xGa_{1-x})_yIn_{1-y}As$) exhibit the linear electrooptic effect, although it is substantially weaker than in some ferroelectrics (e.g., lithium niobate). Unlike the ferroelectrics, however, an electric field applied to bulk GaAs and $Al_xGa_{1-x}As$ can produce changes in the refractive index from two additional mechanisms. One mechanism results from free carrier absorption in semiconductor material. An increase in free carriers in the material results in a decrease in the refractive index. The application of an electric field can result in a change in the free carrier density, thereby altering the refractive index. The second mechanism, known as electrorefraction, occurs for light with photon energies just below the fundamental energy band gap of the material. The application of an electric field alters the characteristics of the optical absorption of the energy band gap, thereby altering the refractive index.

Devices using the linear electrooptic effect have had very limited commercial success. One reason for this lack of success is the relatively large electric field and corresponding large voltage required to induce the necessary change in the refractive index. Some electrooptic materials such as $LiNbO_3$, however, have strong linear electrooptic effects, but they are typically passive materials, meaning that they cannot be fabricated into light emitting and/or detecting devices, thereby limiting their potential for providing monolithically integrated optical circuits. Moreover, the propagation and polarization of light through these electrooptic materials is dependent upon the direction of propagation with respect to the crystal lattice of the material, thereby adding severe design constraints to any device fabrication process. Specifically, the linear electrooptic effect is non-isotropic, and only particular relative orientations of the crystal, the applied electric field and the polarization/propagation direction of the light will necessarily exhibit the needed change in index in order to be used in a waveguide. Thus, both the orientations of the crystal substrate and the polarization of the waves to be guided must be carefully considered in the design of an electrooptic waveguide. Such design constraints have presented major obstacles to achieving commercially practical fabrication techniques for fully integrated electrooptical circuits.

SUMMARY OF THE INVENTION

It is a primary object of the invention to provide a laterally confined optical waveguide in crystalline material that can be fabricated in the material without regard to orientation and is capable of modulating propagation of an optical beam.

It is also an object of the invention to provide devices derived from the laterally confined optical waveguides that are suited for designing multicomponent, optical integrated circuits, particularly monolithic devices. It is a related object of the invention to provide a waveguide according to the foregoing objects that can be easily integrated into a monolithic structure of active material capable of generating light.

It is a further object of the invention to provide a technique for creating laterally confined optical waveguides in accordance with the foregoing object which is susceptible to a relatively easy fabrication process.

It is still another object of the invention to provide laterally confined waveguides with low loss characteristics.

It is yet another object of the invention to provide devices derived from the laterally confined optical waveguides which can readily be constructed using standard photolithography techniques.

Other objects and advantages of the invention will become apparent upon reference to the following detailed description when taken in conjunction with the drawings. To achieve the foregoing objects, a slab waveguide is provided having a core comprising a quantum well structure such that lateral confinement of an optical beam inserted into the core is achieved by the quantum-confined Stark Effect (QCSE). The QCSE is a well-known effect and relates to the shifting to lower photon energies of excitonic resonances in quantum wells. Excitons are bound states of electron-hole pairs which can be generated in response to incident photon energy. At room temperature, excitons are so short lived that their resonances play a minor role in the optical properties in bulk materials. In quantum well structures, however, excitonic resonances are clearly noticeable at room temperatures and provide quantum well structures with strong nonlinear absorption properties.

In accordance with the QCSE, an electric field applied perpendicular to the plane of the quantum well core in the slab waveguide red shifts these nonlinear absorption properties created by excitons. With a shift in the absorption properties, caused by the QCSE there is necessarily also a shift in the refractive index of the quantum well. It is because of this difference in phenomena underlying the QCSE and the linear electrooptic effect that the mathematical relationship between the applied electric field and the change in index of refraction is dominated by quadratic and higher order terms for the QCSE. This is in contrast to the linear electrooptic effect which is dominated by the linear term.

A characteristic of the QCSE which presents a potential barrier to realizing practical devices utilizing the effect is that the largest change in absorption resulting from the QCSE occurs at approximately the same photon energy as the largest change in the refractive index. By selecting an appropriate photon energy for the light beam inserted into the quantum well core, however, a substantial increase in the index of refraction can be obtained without a correspondingly large change in absorption.

In order to laterally confine propagation of a lightbeam through a slab waveguide having a quantum well core, an electric field is applied over a selected area of the waveguide, approximately in line with the inserted optical beam and in a direction generally perpendicular with respect to the plane of the core. By controlling the application of the electric field, the lateral dispersion of the light within the slab can be controlled while maintaining a low loss transmission (assuming the correct photon energy has been selected). Optoelectronic devices may be fabricated based on the control of the lateral confinement of the light beam. For example, the waveguide can be placed between fiber-optic cables in order to modulate an optical signal carried by the cables.

Because of the different underlying phenomena, the linear electrooptic effect and the QCSE are characterized by significant differences. Some of these differences make quantum well core waveguides much more favorable for device fabrication then waveguides formed in bulk crystalline materials. For example, unlike the linear electrooptic effect, the change in the refractive index in a QCSE quantum well core is independent of orientation. Specifically, considering the quantum well core of a slab waveguide to lie in an x-y plane of a Cartesian coordinate system, the QCSE acts to laterally confine a beam inserted into the core regardless of its orientation with respect to the x and y axis. In the z axis, the beam is confined by top and bottom claddings in a conventional manner.

BRIEF DESCRIPTION OF THE DRAWINGS

FIG. 5c is an idealized spectrum of the change in the absorption ($\Delta \alpha$) for the quantum well core of the waveguide in FIG. 4, where the change is between the absorption at no applied electric field and the absorption at an applied electric field of the same constant magnitude as the electric field associated with FIG. 5a;

While the invention will be described in connection with a preferred embodiment, there is no intention to limit it to that embodiment. On the contrary, the intent is to cover all alternatives, modifications, and equivalents falling within the spirit and scope of the invention as defined by the appended claims.

DETAILED DESCRIPTION OF THE PREFERRED EMBODIMENT

Figure 1:
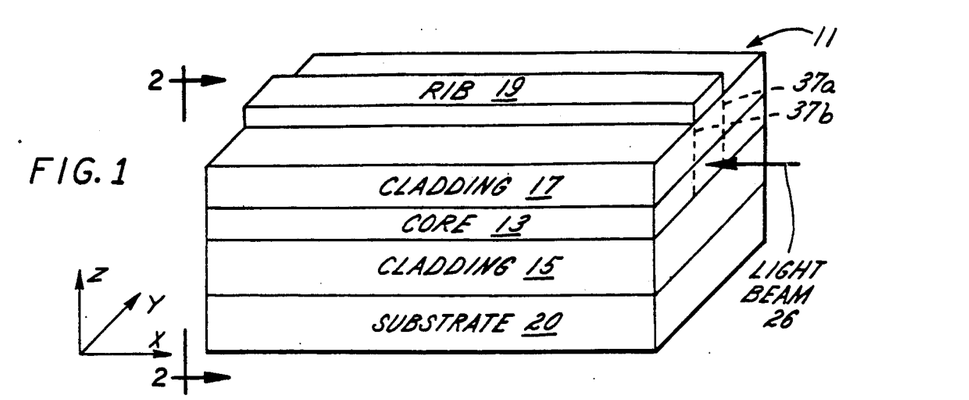
FIG. 1 is a perspective view of a slab waveguide that may be configured to provide a laterally confined waveguide in accordance with the invention.

Turning to the drawings and referring first to FIG. 1, an exemplary p-i-n diode waveguide 11 is illustrated, having a core region 13 for propagating an optical beam interposed between first and second cladding regions 15 and 17, respectively. For the purpose of aiding in the description of the invention, the cladding and core regions are referenced to x, y and z axes of a Cartesian coordinate system. Each region of the waveguide 11 is epitaxially grown using conventional techniques on a substrate 20. The growth is along the z axis, forming layers having width and length dimensions generally along the x-y axes. Waveguides fabricated in this manner are commonly called "slab" waveguides.

As is well known in the art, each of the cladding regions 15 and 17 may be entirely formed of one material or may be composed of alternating layers of materials epitaxially grown one over another. For example, in semiconductor slab waveguides, each cladding region may be a single layer of $Al_xGa_{1-x}As$ or alternating layers of GaAs and $Al_xGa_{1-x}As$. As for the core 13 of the semiconductor slab waveguide 11, it is typically formed of $Al_yGa_{1-y}As$, where x is greater than y so that the effective index of refraction (n) is higher in the core region. Specifically, the index of refraction (n) is a function of the concentration of aluminum such that the greater the concentration, the smaller the index of refraction.

Figure 2:
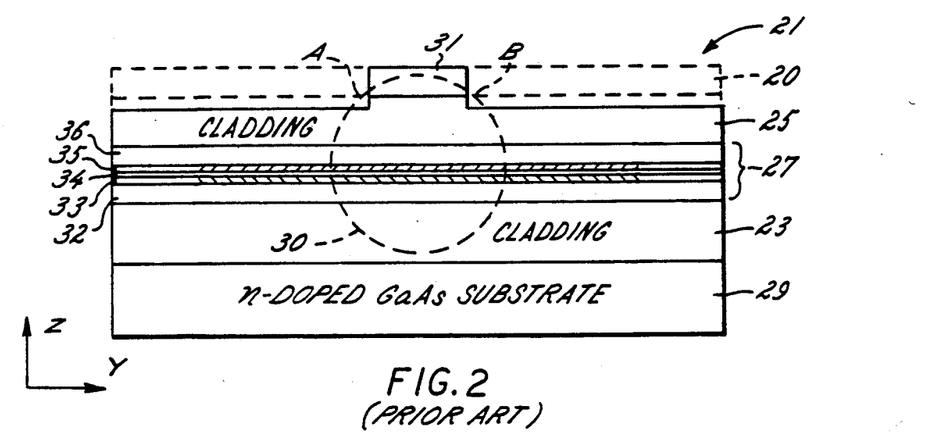
FIG. 2 is an end view of the slab waveguide of FIG. 1 configured to provide a quantum well core wherein lateral confinement of an optical beam is in accordance with a prior art technique.
Figures 4, 5A:
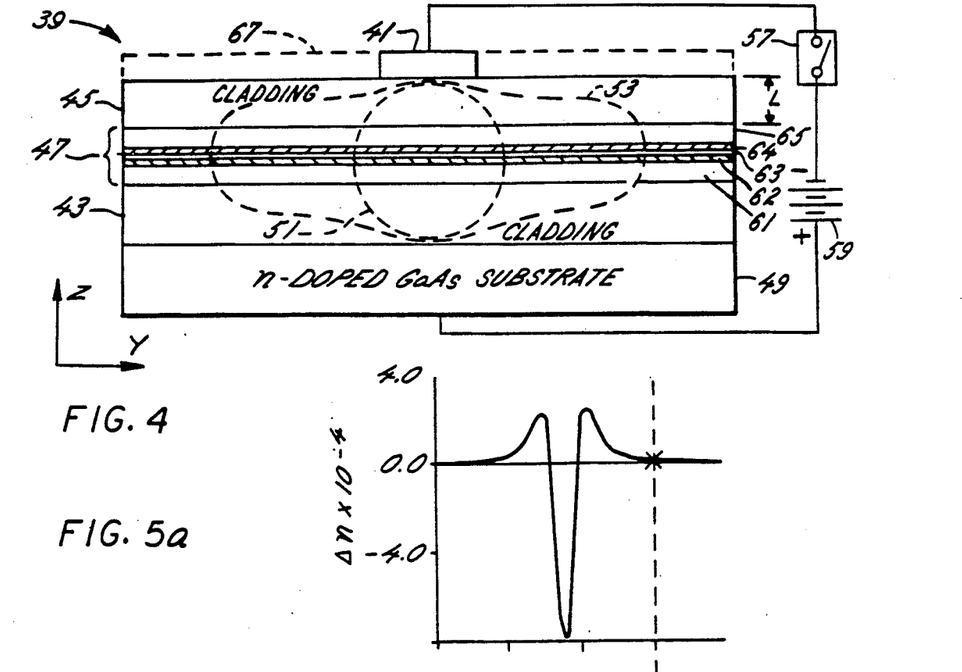
FIG. 4 is an end view of the slab waveguide of FIG. 1 configured to provide a quantum well core wherein lateral confinement of an optical beam is in accordance with the present invention.
FIG. 5a is an idealized spectrum of the change in the refractive index ($\Delta n$) of the quantum well core in the waveguide of FIG. 4 where the difference is between the index at no applied electric field and the index at an applied electric field of constant magnitude.

For purposes of facilitating understanding of the invention, the waveguides of FIGS. 2 and 4 are assumed to have the same general box-like shape, orientation and elemental components as the waveguide in FIG. 1. Therefore, the end views of these waveguides in FIGS. 2 and 4 are referenced to the illustration of the waveguide of FIG. 1 in order to provide a greater appreciation of each of their structures and its interaction with an inserted light beam 26.

The waveguide 11 of FIG. 1 may function as a channel waveguide for guiding a light beam along a selected area of the waveguide core by utilizing a rib 19 on top of the cladding region 17. In order to form the rib 19, it is typical for a layer of material to be epitaxially grown on the top cladding region 17. In a well-known manner, the layer is coated with a photoresist (not shown) and exposed to ultraviolet light or x-rays through a contact printing mask (not shown) that defines the shape of the rib. The photoresist is developed to form a pattern on the surface which functions as a mask for either wet-chemical or ion-beam-sputter etching.

Referring to FIG. 2, a conventional channel waveguide 21 is formed by first forming two cladding regions 23 and 25 and an interposed core region 27 by way of conventional epitaxial growth techniques on a n-doped GaAs substrate 29 in the same manner discussed in connection with the slab waveguide of FIG. 1. To form a rib 31, a layer of p-doped GaAs material is first epitaxially grown on the top cladding region 25 and then etched in the same manner as described in connection with the rib 19 of FIG. 1.

Since the Al composition of the core region 27 is lower than the composition of the cladding regions 23 and 25, the core region has a higher index of refraction (n) than the cladding; thus, the waveguide 21 will confine the beam of light 26 (FIG. 1) in the growth direction (z axis). In order to confine the light beam laterally, however, and thereby channel propagation of the light along the x-axis, the structure of the waveguide 21 must be modified in the lateral direction (y-axis). This is usually done by defining the rib 31 by etching part way into the cladding region 25 as suggested in FIG. 2 by the removal of an area 20 of the top region 25. Because of the lateral etching into the cladding region 25, the evanescent field 30 of the light beam 26 will penetrate into the ambient environment of the waveguide 21 in the etched areas adjacent the rib 31 as suggested by FIG. 2 at points A and B. Typically, the ambient environment is a material (e.g., air) which has an index of refraction lower than the effective or average index of refraction of the material comprising the rib 31 and the core region immediately under it. Because the evanescent fields 30 of the light beam 26 prefers the higher refractive index of the rib 31 and the area of the core 27 immediately under it, the light beam tends to concentrate in this area of the core, thereby effectively confining the beam in the lateral direction (y-axis) and forming a "channel" waveguide, meaning a laterally confining waveguide.

A significant disadvantage of laterally confined waveguides of the type shown in FIG. 2 is the difficulty of its fabrication process. In forming channel waveguides using the foregoing process, the thickness and width of the rib 31 must be accurately controlled. In this connection, many active waveguide devices require single mode operation. Whether a given waveguide supports single or multiple modes is a sensitive function of rib width and height. To control the thickness, the etch rate needs to be carefully calibrated and is a function of the aluminum concentration x in the $Al_xGa_{1-x}As$ cladding region 25. The easiest method of producing ribs in $GaAs/Al_xGa_{1-x}As$ material is to use wet chemical etching. Such an etching technique produces sloped sidewalls, making the width of the rib a function of etch depth, thereby making it difficult to accurately control the width of the waveguide channel. To prevent the sloped sidewalls from occurring, reactive ion beam etching is typically used to etch into the cladding. Unfortunately, reactive ion beam etching is much more complicated than wet chemical etching. Also, interaction of the evanescent field 30 and the rough sidewalls of the rib 31 causes the light to scatter, thereby increasing losses.

Recent advances in techniques for growing materials epitaxially have allowed for the epitaxial growth of semiconductor layers whose material composition can be precisely controlled to provide a layer thickness as thin as one atomic layer in the growth direction (z axis). Structures consisting of these ultrathin layers of dimensions less than approximately 500 angstroms (Å) are typically known as quantum-well structures. The simplest such structure, called a single quantum well, consists of one ultrathin layer sandwiched between two other layers.

Digressing for a moment to discuss the physics of quantum-well structures, their extremely small dimensions cause quantum size effects to be observed which are not observed in bulk samples of the same material. The ultrathin layer is known as a quantum well if it is composed of a semiconductor with an energy band gap lower than that of the surrounding layers, which are then called barrier layers. For example, the quantum well can be composed of GaAs surrounded by barrier layers of $Al_xGa_{1-x}As$. Because a quantum well structure has different energy band gaps between its layers, the energy bands present discontinuities along the growth direction (z-axis in FIG. 2). Specifically, quantization of the carrier motion in the growth direction produces a set of bound states with discrete energy levels in the quantum well. A multiple quantum-well structure is formed by growing two or more single quantum-well structures adjacent to each other. If the barriers between quantum wells are thin enough so that carriers in the quantum wells can interact with each other by tunnelling through the barriers, then the multiple quantum-well structure is commonly called a superlattice. A multitude of more complex quantum well structures may also be fabricated. Some examples include asymmetric coupled quantum wells, parabolic quantum wells and graded index quantum wells. It is known to incorporate these quantum-well structures into the core of the waveguide 21 in FIG. 2, as indicated by the layers 32, 33, 34, 35 and 36 comprising the core 27.

In quantum-well structures, electrons and holes do not move with their usual three degrees of freedom. They show one-dimensional behavior in the growth direction (z axis) and two-dimensional behavior in the planes of the layers (x-y planes). This reduced dimensionality induces drastic changes in the electric and optical properties of quantum-well materials relative to the same properties found in the materials in a bulk crystalline state. For example, in quantum-well structures, exciton resonance is very strong, even at room temperatures. At photon energies which induce exciton resonances, quantum-well structures exhibit strong absorption as generally indicated by the absorption spectrum shown in solid line in the graph of FIG. 3. Specifically, the exemplary spectrum of absorption ($\alpha$) shown in FIG. 3 with respect to wavelength ($\gamma$) is characterized by a sharp peak in the absorption centered about a wavelength $\gamma_1$. Although absorption peaks from exciton resonances are also found in bulk materials, they are much more prominent at room temperatures in quantum-well structures, primarily because of quantum effects imparted by the ultrathin, quantum-well layers.

Figure 3:
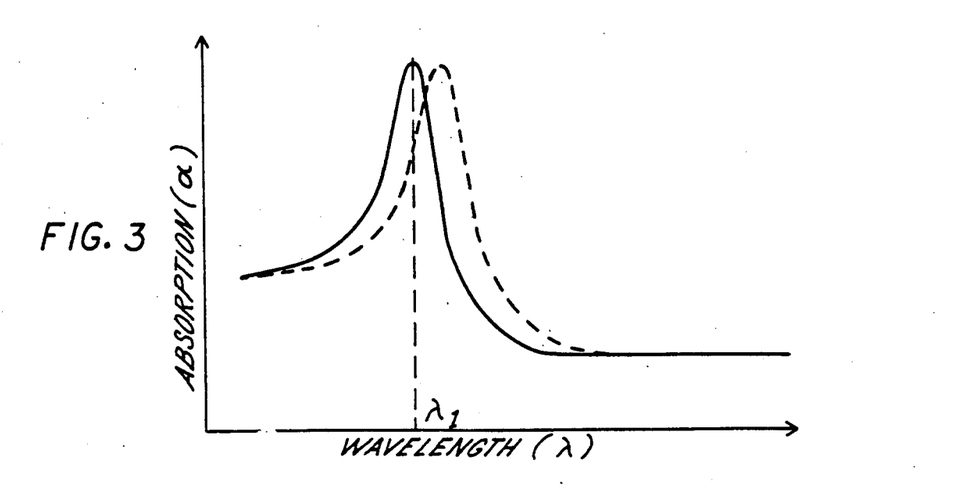
FIG. 3 is an exemplary plot of a spectrum of the absorption ($\alpha$) for a typical quantum well slab waveguide shown as a function of wavelength, wherein the solid line is the spectrum for zero electric field and the dashed line is the same spectrum red-shifted in response to the presence of an electric field in accordance with the quantum-confined Stark Effect.

Excitons in quantum-well structures are known to be sensitive to electrostatic perturbations. Moderate electric fields on the order of 10 millivolts per 100 angstroms (Å), or $10^4$ volts/centimeter, cause significant perturbations. For example, when an electric field is applied along the growth direction, a quantum-well structure exhibits a red shift in the absorption spectrum as indicated by the dashed line in FIG. 3. This phenomenon, which FIG. 3 illustrates, is called the Quantum Confined Start Effect (hereinafter called "QCSE").

Referring again to the channel waveguide of FIG. 2, the optical beam 26 propagates along a channel waveguide defined by the area of the core 27 directly under the rib 31, as indicated by the dashed lines 37a and 37b in FIG. 1. As previously indicated, the core region 27 comprises layers 32–36, with ultrathin layers 33 and 35 defining two quantum wells. In FIG. 2, the first layer 32 of the core region is composed of $Al_yGa_{1-y}As$. The second layer 33 is an approximately 100Å thick layer of GaAs (quantum well).

The third layer 34 is a 100Å thick layer of $Al_yGa_{1-y}As$. The fourth layer 35 is another 100Å thick GaAs quantum well, and the last layer 36 is composed of $Al_xGa_{1-y}As$, where the concentration of aluminum (y) is lower than the effective concentration (x) in the cladding regions 23 and 25. More generally, the core 27 is formed of alternating layers of $Al_xGa_{1-x}As$ and $Al_xGa_{1-y}As$, where z<y. In the specific example given above, z is equal to zero.

Several well-known physical phenomena have been used in waveguides in the past to construct a wide variety of devices in different material systems for use as modulators and switches. In semiconductor material systems chosen from Groups III and V elements, such as GaAs and $Al_xGa_{1-x}As$, three basic phenomena have been used to construct devices based on the change of index of refraction due to an applied electric field—i.e., the linear electrooptic effect, electrorefraction and index changes due to free carrier absorption. In this regard, in addition to its function of laterally confining the light beam 26, the rib 31 in FIG. 2 may also function as an electrical contact for a p-i-n diode waveguide for an applied reverse bias voltage between it and the substrate. This voltage is distributed over the rib and generates an electric field through the core and along the growth direction (z axis). By controlling the strength of the electric field, the absorption of the light beam 26 by the core 27 can be changed in accordance with the QCSE. The sharp absorption peak in FIG. 3 caused by the QCSE allows the quantum-well waveguide of FIG. 2 to function as a modulating device which is very sensitive to changes in the electric field. Without the quantum-well structure in the core region 27, the QCSE is not present and the sensitivity of the index of refraction of the core to changes in an applied electric field is significantly less.

In accordance with one important aspect of the invention, the cladding regions of a quantum-well core waveguide have dimensions in their growth direction (z-axis) that are sufficient to allow an optical beam to spread laterally with respect to the primary direction of the beam as light propagates through the core. Unlike the waveguide of FIG. 2, the waveguide of the invention is characterized by optical properties that allow the optical beam 26 to propagate equally well in all directions of the x-y plane along which the core region lies. Application of an electric field along the growth direction (z axis) over a selected area of the waveguide, however, increases the refractive index (n) in accordance with the QCSE, thereby defining a laterally confining channel waveguide. Although changes in the refractive index of a quantum well core in response to an electric field is a known phenomenon, to the best of applicants' knowledge, such changes have been used in the past only in waveguides in which the optical beam 26 is laterally confined by some physical change in the lateral structure of the waveguide—e.g., lateral etching of the cladding as shown in FIG. 2.

In keeping with the invention, the means for applying an electric field is preferably a contact epitaxially grown on the slab waveguide and etched to form an appropriate structure (e.g., a rib) for the intended application. Unlike the rib of the waveguide according to FIG. 2, however, the contact of the waveguide of the invention does not require etching of the top cladding region. Because the thickness of the top cladding is such that very little of the light field of the optical beam penetrates deeply enough into the cladding to see the contact, very little lateral confinement of the light results from its presence. When a reverse bias voltage is applied across the waveguide by way of a p-doped contact and n-doped substrate, however, the resulting electric field induces a QCSE shift in the quantum wells. Because of the strength of this effect, the core region under the contact exhibits a significant increase in its refractive index, which laterally confines the light.

Referring to FIG. 4, an end view of a waveguide according to the invention is illustrated. The waveguide is generally configured as shown in the perspective view rib 41 of the waveguide 39 is aligned along the x-axis, and it functions as the contact or means for applying an electric field. The growth direction of the layers of the waveguide are aligned along the z-axis, resulting in each layer of the waveguide aligning along an x-y plane. Also like the exemplary waveguide 11 of FIG. 1 and the channel waveguide 21 of FIG. 2, the first and second cladding regions 43 and 45 and the core region 47 are epitaxially grown on a n-doped GaAs substrate 49. Unlike the waveguide of FIG. 2, however, the second or top cladding region 45 is characterized by a dimension L in its growth direction which is sufficient to ensure the evanescent field 51 (confined) and 53 (unconfined) of the light beam 26 does not significantly interact with the rib 41.

It will be appreciated by those knowledgeable in the area of photonics that the evanescent field of the light beam 26 does not have a sharply defined perimeter as suggested in FIG. 4. Instead, the evanescent field dissipates gradually in a tapered fashion. Accordingly, the rib 41 may to some degree provide lateral confinement of the light beam over an extended distance (e.g., millimeters), and the amount of lateral confinement may be adjusted to advantageously isolate light beams in unconfined states where more than one waveguide channel is implemented on a single monolithic slab waveguide. Alternatively, or in combination with the limited lateral confinement of a light beam provided by the rib 41, the top cladding region 45 may be slightly etched for the purpose of optically isolating each structure on the same monolithic substrate. When no electric field is applied, this slight etch causes the previously non-laterally confined evanescent field 53 to be slightly confined with a lateral dimension much larger than the rib 41 or the confined evanescent field 51. This prevents light from a given device from interfering with neighboring devices.

Fabrication of a channel waveguide in accordance with the invention is much simpler than fabrication of the channel waveguide of FIG. 2. Etching of the contact layer 67 to form the rib 41 is easily controlled by using an etch which preferentially etches GaAs and not the $Al_xGa_{1-x}As$ cladding. Also, the channel waveguide of the invention is less lossy than the channel waveguide of FIG. 2 since significant portions of the evanescent field do not interact with the rough sidewalls of the rib 41 and, therefore, less scattering occurs.

Inserting a light beam of an appropriate wavelength into the waveguide 39 of FIG. 4 along the x axis and in the area of the core 47 directly under the rib 41 (i.e., the channel) causes the light of the beam 26 to propagate along the x axis (normal to and out of the plane of FIG. 4). As the light propagates, the structure of the waveguide 39 allows light to freely spread laterally (along the y axis) as indicated by the dashed outline in FIG. 4 of an unconfined beam 53 exiting the waveguide. By closing a switch 57, a voltage source 59 applies a voltage (V) across the p-doped rib 41 and the n-doped GaAs substrate 49. The voltage (V) in turn generates an electric field in the growth direction (z axis) through a selected area of the core 47 directly under the rib (i.e., the channel). This electric field causes a QCSE shift in the quantum wells under the rib, resulting in an increase in the index of refraction and thereby confining propagation of the light beam 26 along the y axis or "laterally" confining the beam.

Applicants have fabricated and tested a waveguide according to the invention, having two quantum wells in its core as in the embodiment illustrated in FIG. 4. Still referring to FIG. 4, an n-doped 0.25 micron ($\mu$) thick GaAs buffer (not shown) was first epitaxially grown on top of the n-doped GaAs substrate 49. This was followed by the lower or second cladding region 43 which consisted of a 1$\mu$ thick undoped $Al_{0.4}Ga_{0.6}As$ layer. A 0.5$\mu$ core region 47 was grown next and consisted of 0.235$\mu$ layer 61 of $Al_{0.3}Ga_{0.7}As$, a 100 thick GaAs layer 62 (quantum well), a 100Å $Al_{0.3}Ga_{0.7}As$ layer 63, another 100Å GaAs layer 64 (quantum well) and a 0.235$\mu$ layer 65 of $Al_{0.3}Ga_{0.7}As$. This was followed by a 1$\mu$ $Al_{0.4}Ga_{0.6}As$ layer for the cladding region 45 and capped with a 0.1$\mu$ p-doped ($p = 8 \times 10^{18}$ $cm^{-3}$) GaAs layer 67. Using conventional etching techniques, the contact layer 67 was etched to form the rib 41. Instead of fabricating the rib 41 by epitaxially growing an additional layer of GaAs, the rib may alternatively be fabricated from a metallization layer using standard photolithography techniques. Presently, fabricating the rib from the epitaxially grown layer is much easier and, therefore, preferred over fabricating the rib from a metallization layer.

Figure 5B:
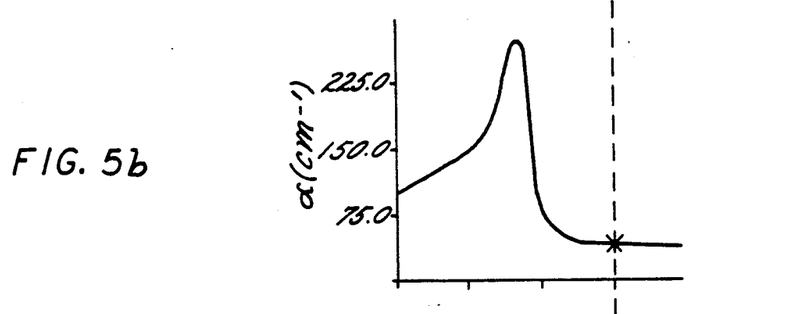
FIG. 5b is an idealized spectrum of the absorption ($\alpha$) of the quantum well core of the waveguide in FIG. 4 without the presence of an electric field.
Figure 5C:
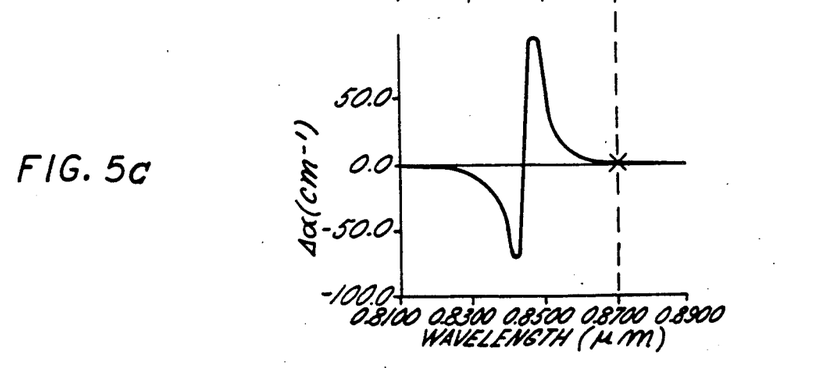

The idealized spectra (i.e., wavelengths of 0.81 to 0.89$\mu$) of the graphs of FIGS. 5a–5c illustrate the absorptive and refractive properties of a quantum-well core in a slab waveguide whose core structure and dimensions are essentially the same as the dimensions of the core fabricated and tested by the applicants. Specifically, these idealized spectra are derived from data reported for incident light of TM and TE polarization and an electric field of $9.3 \times 10^4$ volts/centimeter. The data is reported in Zucker et al., "Electro-Optic Phase Modulation In GaAs/AlGaAs Quantum Well Waveguides", Applied Physics Letters, Vol. 52, No. 12; Mar. 21, 1988: pp. 945–47.

From an analysis of the optical properties of the quantum-well core waveguide provided by the spectra of FIGS. 5a–5c, applicants' selected a wavelength of $0.87\mu$ for a light beam to be inserted into the waveguide fabricated according to the invention.

FIG. 5a plots the difference $\Delta n$ of the refractive index of the quantum-well core when no electric field is present and the index when the electric field ($9.3 \times 10^4$v/cm) is applied. In order for the difference $\Delta n$ to be more easily seen, the scale of the abscissa in FIG. 5a is expanded by $10^4$. At a wavelength of $0.87\mu$, $\Delta n$ has a value of approximately $0.5 \times 10^{-4}$. Referring briefly to FIGS. 5b and 5c, absorption (e) at a wavelength of $0.87\mu$ is at a low level for no applied electric field (FIG. 5b) and there is virtually no change in absorption ($\Delta \alpha$) at that wavelength between no electric field and an applied electric ($9.3 \times 10^4$v/cm) as indicated by FIG. 5c. For many device applications, it is desirable to operate at minimum absorption. By selecting $0.87\mu$ as a wavelength, applicants' found that a sufficient change in refractive index was realized to ensure lateral confinement while also maintaining minimum absorption characteristics. As can be seen from the spectra of FIGS. 5a–5c, the largest changes in the refractive index ($\Delta n$) correspond to either or both large absorptions ($\alpha$) or large changes ($\Delta \alpha$) in absorption between conditions of no applied field and an applied field. Therefore, wavelengths where $\Delta n$ was of the greatest relative values are not practical when low loss characteristics are important.

In the waveguide constructed by applicants, the filling factor $\Gamma$ was significantly larger than that of the device used to collect data in Zucker et al. The filling factor $\Gamma$ specifies the fraction of the optical power flowing through the quantum well layers as compared to the rest of the waveguide core. Because applicants waveguide had a greater filling factor than the waveguide tested by Zucker et al., the amplitudes of the changes in the refractive index ($\Delta n$) averaged over the core were greater for applicants, even though the dimensions of the quantum wells were approximately the same and the applied electric field was of approximately the same magnitude. Because the quantum wells in applicants' core are dimensioned about the same as those in Zucker et al., the value measured by Zucker et al. for the change in refractive index per quantum well ($\Delta n_{QW}$) can be used for applicants' core. At a wavelength of $0.87\mu$, the Zucker et al. data indicate $\Delta n_{QW}$ equals approximately $8 \times 10^{-3}$. For applicants' waveguide, the filling factor $\Gamma$ is estimated to be approximately equal to 200Å/5000Å, or $4 \times 10^{-2}$. Solving to find the change in refractive index ($\Delta n$) at a wavelength of $0.87\mu$:

$$\Delta n = \Delta n_{QW} \cdot \Gamma = 3.2 \times 10^{-4}$$

Figure 6A:
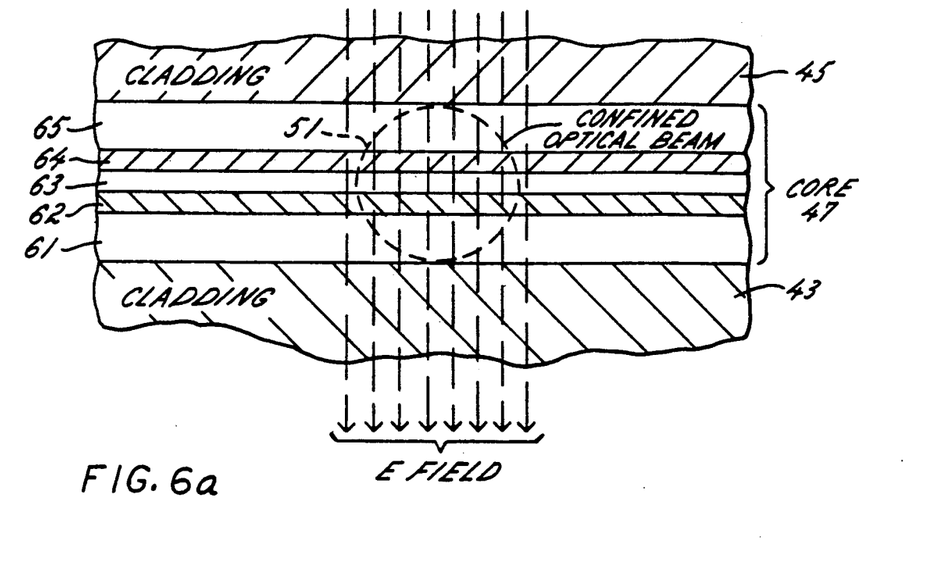
FIG. 6a is an enlarged end view of the waveguide in FIG. 4 illustrating the lateral confinement of an optical beam by an applied electric field in accordance with the invention, where the direction of the beam is out of the plane of the drawing sheet and approximately perpendicular thereto.
Figure 6B:
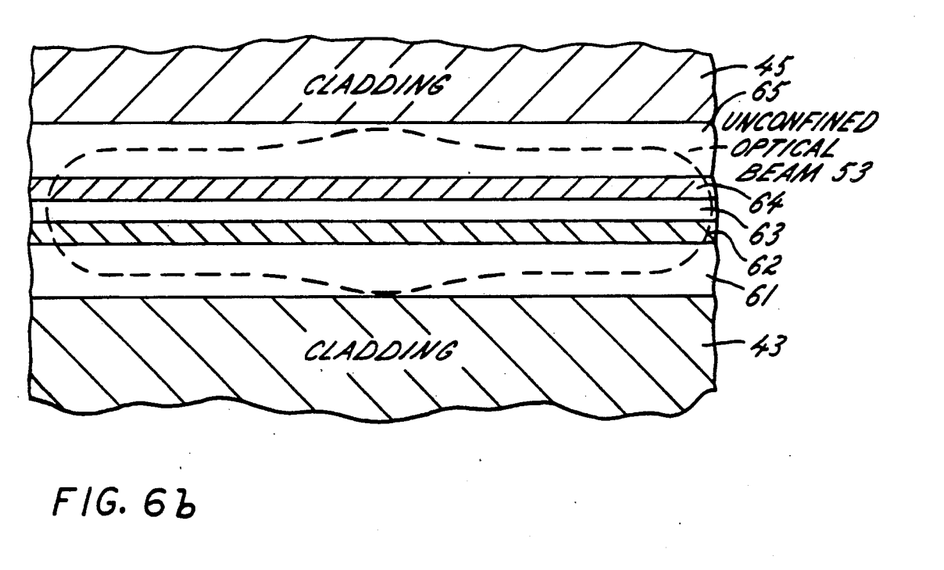
FIG. 6b is the same end view of the waveguide as shown in FIG. 6a, except, the electric field has been removed and the optical beam is unconfined so that it spreads laterally along the plane of the waveguide core in keeping with the invention.

Referring to FIGS. 6a and 6b, the foregoing value of the difference in the refractive index ($\Delta n$) at a wavelength of $0.87\mu$ is sufficient to provide a strong lateral confinement as indicated by the idealized confined optical beam 51 in FIG. 6a, which is intended to illustrate the confinement observed by applicants for their waveguide fabricated according to the invention. Without the applied electric field, the light was observed to spread along the y axis as indicated by the idealized unconfined optical beam in FIG. 6b. Unlike the linear electrooptic effect in cores of bulk material, lateral confinement of the light beam occurred for both TM and TE polarization. Therefore, the quantum-well structures in the core and the QCSE are believed to be clearly responsible for the observed lateral confinement of the light beam.

Figure 7:
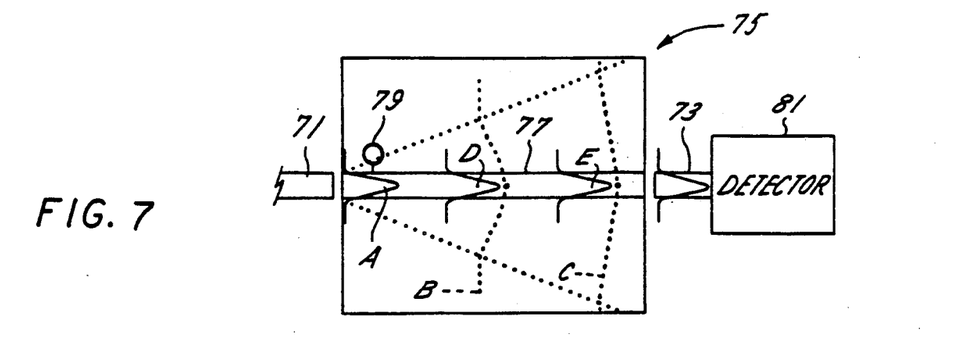
FIG. 7 is a plan view of the waveguide of FIG. 4 coupled to input and output optical fibers to form an optoelectric device for modulating a light beam.

An entirely new family of devices based on waveguides according to the invention is possible, the simplest of which is an intensity modulator inserted between two fiber-optic cables 71 and 73 as illustrated in FIG. 7. In a conventional manner, the tightly confined light from the fiber-optic cable 71 is coupled into one end of a waveguide 75 fabricated according to the invention. At the other end of the waveguide 75 the second fiber-optic cable 73 is aligned with a rib 77 and also coupled thereto in a conventional manner. The interfaces between the waveguide 75 and fiber-optic cables 71 and 73 form an input and output, respectively for the modulator derived from the waveguide.

Light from the fiber 71 couples into the waveguide 75 with the intensity profile of the light indicated at "A" in FIG. 7. When no voltage is applied to the contact or rib 77 by way of a contact pad 79, the light spreads laterally with respect to the primary direction of the beam as it propagates through the waveguide 75. The spreading of the light is illustrated by the waveguide mode intensity profiles shown as dotted curves "B" and "C". By the time the light reaches the second or output fiber 73, the light is laterally spread out and very little of it will couple into the output fiber. When a voltage is applied between the rib 77 and the substrate of the waveguide (see FIG. 4) by way of the contact 79, however, the light will be laterally confined under the conducting strip and a usable portion of the light will couple into the output fiber 73. By "usable portion", applicants mean that sufficient light is coupled into the output fiber so that any information contained in the light is maintained at the output. The lateral confinement of the light beam is indicated by the intensity profiles shown as solid curves "D" and "E". A detector 81 of well-known design placed at the output of the second fiber will thus see the intensity of the light vary with the voltage applied to the rib 77 of the waveguide 75.

Figure 8:
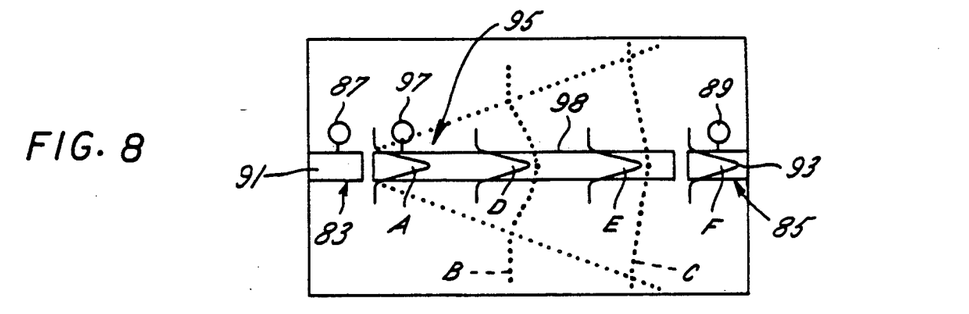
FIG. 8 is a plan view of a monolithic semiconductor device including a plurality of optically aligned and laterally confined waveguides wherein at least one of the waveguides is in accordance with the invention and cooperates with the others to form an integrated optical circuit.

The device illustrated in FIG. 7, although very useful as an intensity modulator for fiber-to-fiber applications, is not well suited for use in a multi-component, monolithic, optical integrated circuit. A slight modification to the device of FIG. 7, however, turns it into an important building block for integrated optics. Specifically, the externally coupled fiber-optic cables are replaced by laterally confined waveguides 83 and 85 as shown in FIG. 8. The input and output guides 83 and 85 may be laterally confining waveguides in accordance with the invention where a DC voltage is constantly applied at contact pads 87 and 89. Alternatively, the input and output channel waveguides 83 and 85 may be formed by etching the ribs 91 and 93 into the cladding in accordance with the prior art approach illustrated in FIG. 2. In either case, the center waveguide 95 acts as an optical modulator which couples light from its input to its output in the same manner as discussed in connection with the waveguide of FIG. 7 in response to a voltage applied at contact pad 97. When a voltage is applied to the contact pad 97, a rib 98 causes an electric field to be applied to the core which in turn causes a change in the refractive index, and the light propagates with an intensity profile suggested by waveforms "A", "D", "E" and "F". When the electric field is removed, the light disperses laterally as suggested by the intensity profiles "B" and "C" shown in dotted lines. Such a modulator as illustrated in FIG. 8 can be repeated multiple times on a single optical chip, thereby lending itself well to optical integration.

Figure 9:
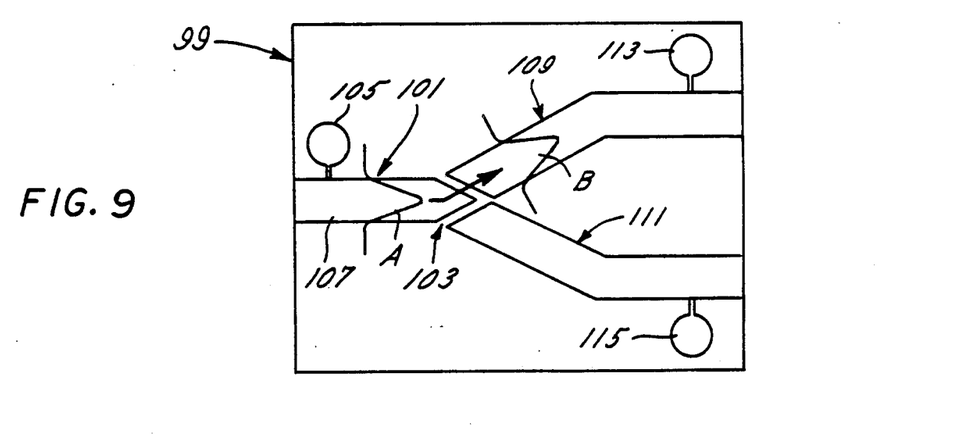
FIG. 9 is a plan view of a monolithic semiconductor device including a plurality of laterally confined waveguides according to the invention forming a fully integrated bi-directional switch.

More sophisticated devices can also be constructed employing a waveguide according to the invention. For example, a directional switch 99 incorporating the invention is illustrated in FIG. 9. In this device, a waveguide 101 may be fabricated according to either the invention or the prior art approach shown in FIG. 2. The waveguide 101 functions as the input to the junction 103 of the Y-branch of the switch 99. If the waveguide 101 is fabricated according to the invention, a static DC voltage is applied to a contact pad 105 of a rib 107 in order to maintain lateral confinement of a light beam illustrated by the intensity profile "A". Each arm of the Y-branch, however, consists of a waveguide 109 or 111 fabricated in accordance with the invention. The direction, if any, that the light follows in one of the arms of the Y-branch will be determined by which of the waveguides 109 or 111 has a voltage applied at its contact 113 or 115, respectively. For example, if a voltage is applied at contact pad 113 and not at pad 115, light will propagate along the input waveguide 101 as indicated by waveform "A" and into the waveguide 109, as indicated by waveform "B". This directional switch 99 may function with optical fibers (not shown) attached to each of the ends, or it may be part of a larger monolithic optical integrated circuit in which many directional branches are intermixed.

Figure 10:
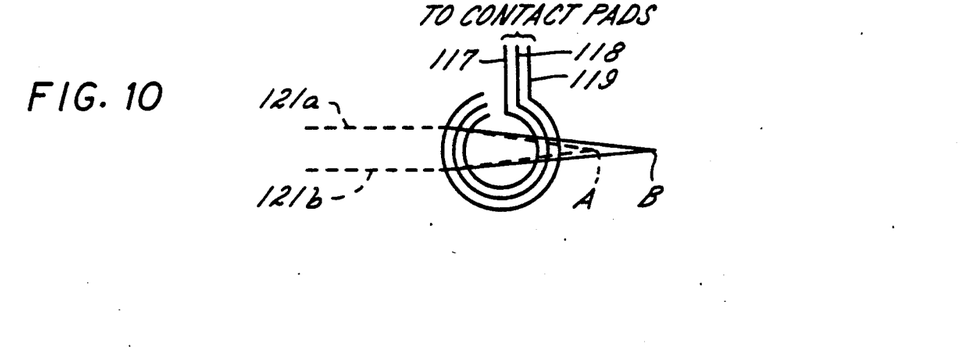
FIG. 10 is a plan view of a monolithic semiconductor device including a variable focus lens using the principle of the invention.

Yet another device that can be fabricated in keeping with the invention is a field-induced lens with a voltage-controlled variable focal length. FIG. 10 illustrates such a device. Light impinging on this device can originate from either a laterally confined guide or an unconfined slab waveguide (not shown). A series of arcs 117–119 function as the contacts or means for applying the electric field. Each of the arcs 117–119 are individually addressable by way of contact pads (not shown) for the purpose of shaping the light in whatever manner is desired. The arcs 117, 118 and 119 are formed in the same well-known manner as the ribs in FIG. 7-9 (i.e., conventional photolithography and etching techniques), except their shape is obviously different than that of the ribs. Each of the arcs 117, 118 and 119 causes an electric field to be applied to a selected area of the core region of the waveguide. The electric field presents a curved front to an optical beam propagating in a direction and path generally indicated by the dashed lines 121a and 121b in FIG. 10. The curve of each arc 117–119 and its associated curved electric field creates a change in the refractive index which is curved along the lateral direction of the beam, thereby refracting the light in a lens-like manner.

By applying a different voltage to each arc, the effective change in the refractive index within the area of the waveguide's core region directly under the arc is different from neighboring areas, thus affecting the optical path length differently for each part of the optical wave front. For instance, the focal point of the lens can be dynamically changed from point A to point B in FIG. 10 by changing the voltages applied to the contact pads. This effect gives the ability to control the focus of light in a waveguide with an electric field. Conversely, using the same principles which provide for a variable focus, the arcs 117–119 can be shaped to cause the light to diverge. By controlling the voltage applied to the arcs, the degree of divergence can be precisely controlled.

The devices discussed herein and illustrated in FIGS. 7-10 are certainly not an exhaustive list of devices which can be derived from the invention. It will be appreciated by those skilled in the art of photonic devices that many other active devices can be realized, depending on the particular needs of an application.

In summary, waveguides fabricated in accordance with the invention are much easier to process as the etching requirements are less stringent than for prior art devices. Furthermore, the losses from waveguides incorporating the invention are believed to be significantly less than etched-rib waveguides as the fields of the waveguide modes are far from the etched contact rib. Finally, devices utilizing the invention can be used with and/or replace those made from etched-rib waveguides and, as discussed herein, new device structures are possible. Applicants expect that waveguides incorporating the invention will be used for many applications which will lead to a family of photonic devices that will play an important role in the use of integrated optics for information processing and the like.

We claim:

1. A semiconductor optical element for propagating light from an optical beam comprising:
    a first cladding region;
    a second cladding region;
    a core for receiving the optical beam interposed between the first and second cladding regions and comprising at least one quantum well structure;
    each of the first and second cladding regions having dimensions that allows the light of the optical beam to spread laterally with respect to a primary direction of the beam as the light propagates through the core; and
    means for applying an electric field in a selected area of the core for laterally confining the light of the optical beam to the selected area.

2. A semiconductor optical element as set forth in claim 1 wherein the first and second cladding regions and the core are compounds from Group III and Group V elements.

3. A semiconductor optical element as set forth in claim 2 wherein an index of refraction for the core is greater than an index of refraction for either the first or second cladding regions.

4. A semiconductor optical element as set forth in claim 3 wherein the first and second cladding regions include $Al_xGa_{1-x}As$, where x is less than one.

5. A semiconductor optical element as set forth in claim 4 wherein the core comprises alternating layers of $Al_xGa_{1-x}As$ and $Al_yGa_{1-y}As$, where $z<y\leq x$.

6. A semiconductor optical element as set forth in claim 5 where the core comprises alternating layers of GaAs and $Al_xGa_{1-y}As$, where z equals zero.

7. A semiconductor optical element as set forth in claim 1 wherein the first and second cladding regions and the core are compounds from Group II and Group VI elements.

8. A semiconductor optical element as set forth in claim 1 where the means for applying an electric field includes a rib fabricated on one of the first and second cladding regions and a substrate in contact with the other of the first and second cladding regions.

9. A semiconductor optical element as set forth in claim 8 wherein the rib is formed by epitaxially growing a layer of material on one of the first and second cladding regions and etching selected areas of the layer in order to define the rib.

10. A semiconductor optical element as set forth in claim 1 wherein one of the rib and substrate is composed of p-doped GaAs and the other is n-doped GaAs.

11. A device incorporating the semiconductor optical element as set forth in claim 1 including in combination:
an input device for delivering the optical beam to the core;
at least one output device for receiving the beam after it has propagated through the element; and
means for modulating the electric field in order to vary the light intensity of the optical beam received by the at least one output device.

12. A device as set forth in claim 11 wherein the input and output devices are optical fibers.

13. A device as set forth in claim 11 wherein the input and output devices are semiconductor waveguides formed from part of a monolithic structure including the semiconductor optical element.

14. A device as set forth in claim 13 wherein each of the output devices is a semiconductor optical element as defined in claim 1 and the device includes:
means for modulating the electric field of the output devices so as to preferentially direct the light beam to one or more of the output devices.

15. A device incorporating more than one of the semiconductor optical elements set forth in claim 1 wherein said device includes:
a monolithic substrate; and
means for optically isolating each element from all other elements on the substrate in a lateral direction with respect to the primary direction of the beam in the element.

16. A semiconductor optical element as set forth in claim 1 wherein the means for applying an electric field is shaped to create an electric field in the core which acts on the light as a lens in a lateral direction with respect to the primary direction of the optical beam.

17. A semiconductor optical element as set forth in claim 16 wherein the means for applying an electric field is shaped to create an electric field which causes the light of the optical beam to converge at a focus.

18. A semiconductor optical element as set forth in claim 17 wherein the electric field comprises a plurality of discrete electric fields and means for modulating each of the discrete electric fields in order to adjust the location of the focus.

19. In a semiconductor optical element having a core forming a plane extending along a first and second axes of a Cartesian coordinate system and positioned between two cladding regions, where the core contains at least one quantum well and has an input and output, a method comprising the steps of:
inserting light of an optical beam into the input of the core along the first axis;
allowing the light to laterally propagate substantially freely in the second axis of the core while confining lateral propagation of the light in the third axis by way of an index of refraction differential between the core and the first and second cladding regions; and
applying an electric field to a selected area of the core in order to induce a quantum confined Stark Effect shift in an absorption spectrum for the selected area of the core that sufficiently changes the refractive index of the selected area relative to the remaining area of the core so as to confine lateral propagation of the light in the second axis and direct the light to the output.

20. A method as set forth in claim 19 including the step of selecting the value of a wavelength of the optical beam so that the change in the refractive index of the core upon application of the electric field is sufficient to confine the propagating light while maintaining absorption of the light at a low level which allows the element to function as a waveguide that transmits a useable portion of the optical beam to the output.

21. A method as set forth in claim 19 including the step of alternating between allowing the light to laterally propagate and confining lateral propagation by way of the application of the electric field in order to effectively modulate the light of the optical beam transmitted to the output.

22. A method as set forth in claim 19 wherein the first and second regions of cladding each have a thickness in the direction of the third axis such that any structure on a surface of the region facing away from the core used for the purpose of applying the electric field will not significantly affect the propagation of light through the core.

23. A method as set forth in claim 19 wherein the core is composed of alternating layers of compounds from Group III and Group V elements.

24. A method as set forth in claim 19 wherein the core is composed of alternating layers of compounds from Group II and Group VI elements.

25. A method as set forth in claim 19 wherein the optical element is fabricated on a monolithic substrate including other optical elements, the method including the step of:
optically isolating the optical element from the other optical elements sharing the monolithic substrate so that lateral propagation of the light does not interfere with the proper functioning of the other optical elements.

* * * * *

UNITED STATES PATENT AND TRADEMARK OFFICE
CERTIFICATE OF CORRECTION

PATENT NO. : 5,048,907
DATED : September 17, 1991
INVENTOR(S) : Randy W. Wickman, etal It is certified that error appears in the above-identified patent and that said Letters Patent is hereby corrected as shown below:

Column 8, line 28, "$Al_xGa_{1-y}As$" should read --$Al_yGa_{1-y}As$--.

Column 8, line 31, "$Al_xGa_{1-x}As$" should read --$Al_zGa_{1-z}As$--.

Column 8, lines 31 and 32, "$Al_x Ga_{1-y}As$" should read --$Al_yGa_{1-y}As$--.

Column 9, lines 35 and 36, "perspective view rib 41" should read --perspective view of the exemplary waveguide of FIGURE 1. Specifically, a rib 41--.

Column 10, line 43, "a 100 thick" should read --a 100 Å thick--.

Column 10, lines 48 and 49, "(p = $8x10^{18}$ cm$^{-3}$)" should read --(p = $8x10^{18}$ cm$^{-3}$)--.

Column 11, line 15, "absorption (e)" should read --absorption ($\alpha$)--.

Signed and Sealed this

First Day of June, 1993

Attest:

MICHAEL K. KIRK

*Attesting Officer*    *Acting Commissioner of Patents and Trademarks*